May 1, 1945.  J. M. O'MALLEY  2,375,030
UNIVERSAL COUPLING
Filed Dec. 11, 1942
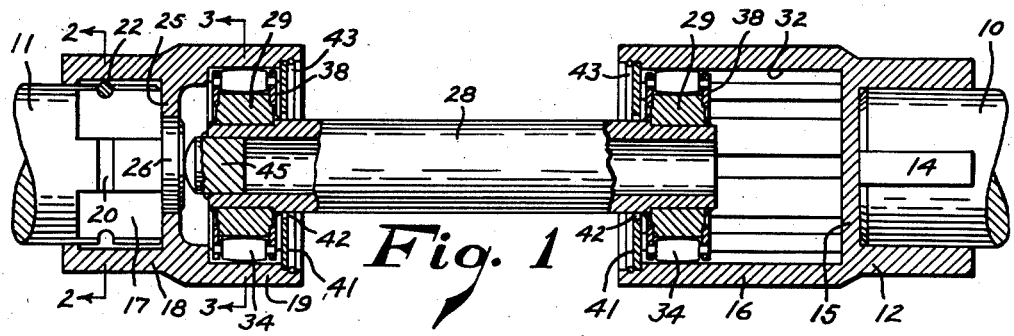
Fig. 1
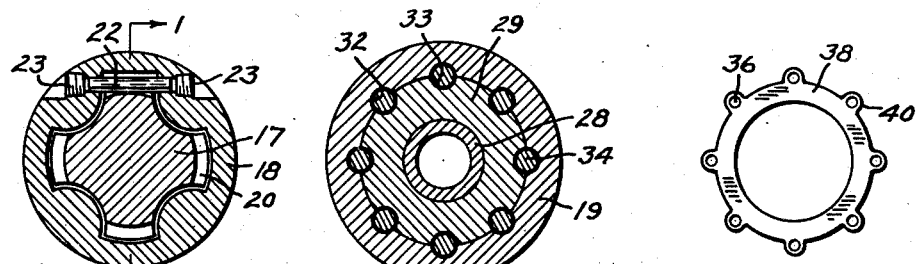
Fig. 2  Fig. 3  Fig. 4
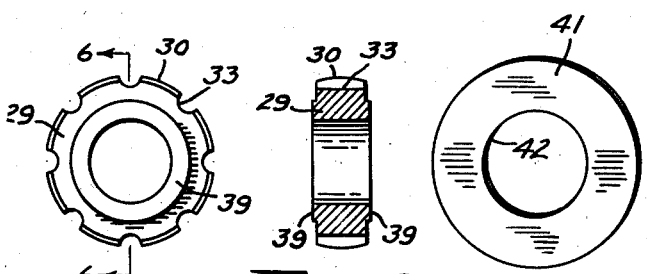
Fig. 5  Fig. 6  Fig. 7  Fig. 8
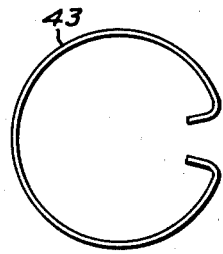
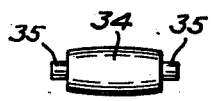
Fig. 9
Inventor
JOSEPH M. O'MALLEY
By Albert G. Blodgett
Attorney Patented May 1, 1945

2,375,030

UNITED STATES PATENT OFFICE 2,375,030

UNIVERSAL COUPLING

Joseph M. O'Malley, Worcester, Mass., assignor to Morgan Construction Company, Worcester, Mass., a corporation of Massachusetts Application December 11, 1942, Serial No. 468,671

4 Claims. (Cl. 64—8)

This invention relates to universal couplings, and more particularly to the construction of coupling spindles of the type used for connecting the roll necks in a rolling mill to the pinion shafts.

When employed in such service, couplings are not only subjected to very heavy torques but they must also operate under conditions of severe misalignment, since the mill rolls are adjustable transversely of their axes. While many different constructions have been proposed heretofore for this purpose, they have in general been expensive to manufacture and subject to excessive wear.

It is accordingly one object of the invention to provide a universal coupling which will be comparatively simple and inexpensive to manufacture.

It is a further object of the invention to provide a universal coupling which will be capable of transmitting relatively heavy torques under conditions of severe misalignment without excessive wear.

With these and other objects in view, as will be apparent to those skilled in the art, the invention resides in the combination of parts set forth in the specification and covered by the claims appended hereto.

Referring to the drawing illustrating one embodiment of the invention and in which like reference numerals indicate like parts, Fig. 1 is a longitudinal section through a universal spindle coupling for a rolling mill, the section being taken on the line 1—1 of Fig. 2;

Fig. 2 is a section on the line 2—2 of Fig. 1;

Fig. 3 is a section on the line 3—3 of Fig. 1;

Fig. 4 is a detail of a roller retaining ring;

Fig. 5 is an end view of a coupling head or hub;

Fig. 6 is a section on the line 6—6 of Fig. 5;

Fig. 7 is a detail of a grease retaining ring;

Fig. 8 is a detail of a snap ring; and

Fig. 9 is an enlarged detail of a roller.

In the drawing there is shown a coupling connecting a pinion shaft 10 to a roll neck 11 of a rolling mill roll. A coupling member 12 is mounted on the pinion shaft and connected thereto by a key 14, this coupling member having a transverse web 15 located adjacent the end of the shaft and a hollow cylindrical portion or sleeve 16 which extends beyond the end of the shaft. The roll neck 11 is provided with the useful fluted wabbler 17 on which is mounted a coupling member 18 having a hollow cylindrical portion or sleeve 19 which extends beyond the end of the wabbler. The wabbler is provided with a circumferential groove 20 to receive a transverse pin 22 mounted in the member 18 and held in place by two screw-threaded plugs 23, as best shown in Fig. 2. The member 18 is provided intermediate its length with a transverse web 25 which is bored to fit a pilot boss 26 projecting from the end of the wabbler 17.

The two coupling members 12 and 18 are spaced apart axially, provision being made for the transmission of torque between them. For this purpose there is provided a coupling spindle 28, which may be of tubular construction, having adjacent each of its ends a head 29 of generally circular cross-section fitting within the interior of the adjacent sleeve 16 or 19. Preferably each head 29 is constructed as a separately formed annular member bored to fit closely upon a slightly reduced end portion of the spindle and firmly welded thereto. As shown in Figs. 5 and 6, the peripheral surface 30 of each head is made spherical so that the head can rock freely in every direction within its corresponding sleeve 16 or 19. Each of these sleeves is provided with a cylindrical inner surface interrupted by a series of longitudinally extending semi-cylindrical grooves 32 (Fig. 3), and each of the heads 29 is provided in its outer surface with a series of longitudinally extending semi-cylindrical grooves 33 which are complementary to the grooves 32. Within each of the openings formed by the pairs of grooves 32 and 33 there is mounted a roller 34 of solid metal having a barrel-shaped external surface. The diameter of these rollers at their midpoints is slightly less than that of the grooves, so that the rollers may serve as torque-transmitting keys without interfering with the rocking motion of the heads 29 required during misalignment of the shafts 10 and 11.

The rollers 34 are preferably secured to the heads 29 in such a manner that these parts will remain in their correctly assembled relationship even though the heads be withdrawn from the coupling members. For this purpose each roller is provided at each of its ends with a trunnion 35, and these trunnions fit loosely within openings 36 formed in rings 38 secured to opposite sides of the heads 29. As indicated in Figs. 5 and 6, the heads 29 are provided on both sides with bosses 39. These bosses are of the proper diameter to fit closely within the rings 38, and after the parts have been assembled the rings are welded to the heads. The openings 36 are located within ears 40 (Fig. 4) projecting radially from the rings 38. At assembly these ears fit within the grooves 32 with ample clearance to avoid any interference with the walls of the grooves during operation.

In the event the spindle is to be used in connection with a rolling mill of the type having an open-top housing, from which the rolls are removed in a vertical direction, the parts are preferably so constructed and arranged that the coupling member 18 can be withdrawn axially from the wabbler 17 in order to permit upward removal of the roll. For this purpose the web 15 of the coupling member 12 is spaced for a considerable distance from the adjacent end of the spindle 28, and the corresponding grooves 32 are extended toward this web. Thus, after the pin 22 has been removed, the coupling member 18 can be withdrawn from the wabbler 17, the spindle 28 moving axially until it engages the web 15. This will permit removal of the roll as desired.

The sleeves 16 and 19 are preferably packed with grease for lubrication purposes, and in order to retain this grease each of these sleeves is counterbored at its outer or overhanging end to receive a flat ring 41 having a central opening 42. This opening is slightly greater in diameter than the spindle 28, so that there will be no interference with the spindle during conditions of misalignment. Each ring 41 is held in place by a snap ring 43 which fits a suitable groove in the coupling member. Preferably a rounded plug 45 is welded or otherwise secured to the end of the spindle 28 in a position to engage the end of the boss 26.

It will be apparent that the apparatus is comparatively simple and inexpensive to manufacture. The sleeves 16 and 19 can be bored to the desired internal diameter, and the heads 29 can be turned to the proper size to fit closely within the sleeves. Thereupon the grooves 32 and 33 can be formed by drilling cylindrical holes into the assembled parts, after which the heads 29 can be withdrawn and the desired spherical surface 30 formed on each. The rings 41 will be welded to the heads to hold the rollers 34 in their proper places within the grooves 33, and the heads will then be welded to the spindle 28. Before the second head is placed on the spindle, the spindle should be inserted through the rings 41 and 43.

In the operation of the invention the barrel-shaped rollers 34 will serve to connect the spindle heads with the surrounding coupling members, so that heavy torques may be transmitted. If the shaft 10 and roll neck 11 are out of alignment, the heads will rock within the coupling members. The rings 38 will hold the rollers 34 in their proper positions within the grooves 33 at all times, and these rollers will not drop out even if the couplings are disassembled. The rings 41 will retain grease within the coupling members to ensure proper lubrication of the parts. The coupling member 18 can readily be withdrawn from the wabbler 17 to allow upward removal of the roll.

Having thus described my invention, what I claim as new and desire to secure by Letters Patent is:

1. A universal coupling comprising a hollow outer member having a cylindrical inner surface interrupted by a series of longitudinally extending semi-cylindrical grooves, an inner member positioned within the outer member and having a peripheral surface interrupted by a series of longitudinally extending semi-cylindrical grooves which are complementary to the first-mentioned grooves, a barrel-shaped roller located within each pair of adjacent grooves to form a driving connection between the said members, and means connecting the rollers with the inner member to retain the rollers within the grooves in the inner member when the two members are separated.

2. A universal coupling comprising a hollow outer member having a cylindrical inner surface interrupted by a series of longitudinally extending semi-cylindrical grooves, an inner member positioned within the outer member and having a peripheral surface interrupted by a series of longitudinally extending semi-cylindrical grooves which are complementary to the first-mentioned grooves, a barrel-shaped roller located within each pair of adjacent grooves to form a driving connection between the said members, and two rings on opposite sides of the inner member and connected to the rollers to retain the rollers within the grooves in the inner member when the two members are separated.

3. A universal coupling comprising a hollow outer member having a cylindrical inner surface interrupted by a series of longitudinally extending semi-cylindrical grooves, an inner member positioned within the outer member and having a peripheral surface interrupted by a series of longitudinally extending semi-cylindrical grooves which are complementary to the first-mentioned grooves, a barrel-shaped roller located within each pair of adjacent grooves to form a driving connection between the said members, the rollers having trunnions on their ends, and two rings secured to the inner member on opposite sides thereof, the rings having holes therein to receive the said trunnions.

4. A universal coupling comprising a hollow outer member having a cylindrical inner surface interrupted by a series of longitudinally extending semi-cylindrical grooves, an inner member positioned within the outer member and having a peripheral surface interrupted by a series of longitudinally extending semi-cylindrical grooves which are complementary to the first-mentioned grooves, a barrel-shaped roller located within each pair of adjacent grooves to form a driving connection between the said members, the rollers having trunnions on their ends, and two rings secured to the inner member on opposite sides thereof, the rings having ears which project radially into the grooves in the outer member, the ears having holes therein to receive the said trunnions.

JOSEPH M. O'MALLEY.